Patented Sept. 26, 1950

2,523,939

UNITED STATES PATENT OFFICE 2,523,939

PREPARATION OF SUBSTITUTED PHENOLS

Clinton A. Braidwood, Ferndale, Mich., assignor to Reichhold Chemicals, Inc., Detroit, Mich.

No Drawing. Application November 25, 1946, Serial No. 712,053

8 Claims. (Cl. 260—624)

The invention relates to the alkylation of phenols, and more particularly to the preparation of paratertiary butyl phenol by reacting phenol with isobutylene in the liquid phase in the presence of an inert organic solvent and a catalyst comprising essentially fluosulfonic acid, whereby a high yield of paratertiary butyl phenol is obtained.

It is already known that to alkylate phenols various alkylation catalysts, promoters, or activators such as boron fluoride, the metal halides, such as aluminum halide and iron halides, such as ferric chloride, acid-activated clay, the mineral acids, for example, sulfuric, may be used.

Insofar as I am aware the alkylation of phenols with olefins using fluosulfonic acid is novel, and I have found that by its use unexpectedly favorable results are obtained. The use of this catalyst not only makes processing easier but results in excellent yields of the desired product.

The most universally used alkylation catalysts for phenol alkylation are the metallic halides, particularly aluminum chloride. However, there are certain distinct disadvantages inherent in its use. As is well known, aluminum chloride is very sensitive to moisture and consequently is easily poisoned. Metallic halides readily hydrolyze when in contact with small amounts of moisture liberating hydrogen chloride as in the case of aluminum chloride. Hydrochloric acid is very corrosive to standard metal equipment. It is generally necessary to run this type of catalyst in expensive glass lined equipment due to corrosion. The life of the catalyst is generally quite short as it must be either discarded or regenerated by a costly procedure. The removal of metallic halides from the reactant solution is always a difficult and lengthy procedure as most of the generally used metals in metallic halides used in alkylation are amphoteric.

Sulfuric acid, another catalyst often used for the alkylation of phenols, also has certain distinct disadvantages inherent in its use. As is well known, sulfuric acid is an oxidizing agent and, under conditions employed in carrying out alkylation reactions, it is practically impossible to eliminate completely the oxidizing tendencies of this catalyst. As a result, the yield of the desired alkylation product is materially decreased. The length of time during which any given concentration of sulfuric acid remains effective is also materially shortened due to these oxidizing tendencies. Hence, the catalyst life may be the determining factor in a commercial operation.

It has now been found that many of the disadvantages inherent in a sulfuric acid and/or metallic halides alkylation processes may be successfully eliminated by the use of fluosulfonic acid as a catalyst. From an economic standpoint there are distinct advantages to be offered.

The oxidizing effect of concentrated sulfuric acid is eliminated by using fluosulfonic acid as the alkylation catalyst.

Smaller quantities of fluosulfonic acid are required compared to sulfuric acid.

The process is applicable to olefins and diolefins.

The reaction is very complete as may be seen by the yields set forth in the accompanying examples.

The catalyst may be easily removed, recovered and used again.

This process may be carried out in steel or stainless steel equipment without appreciable corrosion. This makes it very advantageous since regular processing units of standard manufacture may be used for the alkylation.

According to my preferred process the alkylation is carried out in the liquid phase. In the preparation of paratertiary-butyl phenol the phenol is dissolved in an inert organic solvent and the fluosulfonic acid is then added. The olefin, isobutylene in a 1:1 or 1.1:1 molar ratio is then added through the solution during agitation at either atmospheric or superatmospheric pressure at such a rate so as to maintain the temperature about 25° C. to obtain the highest yields of para substituted phenols. The reactant solution then can be conducted to a settling vessel or separating device from the bottom of which the liquid fluosulfonic acid is withdrawn and either discarded or returned to the alkylation zone depending upon the degree of degradation of the acid. The upper layer containing the alkylation product is then washed or neutralized and subjected to the useful fractionating procedure. The alkylated phenol is obtained in excellent yield. The unreacted phenol, and ortho tertiary butyl phenol and the inert solvent are then recycled through the system.

The process may be carried out either as a batch or continuous process operation, although for economical reasons it is preferred to carry the reaction out continuously. It is known that in this type of reaction when using gaseous olefins the more intimate the contact between the phenol, olefins and catalyst the higher will be the yields of the alkylated phenol. This can be accomplished by the use of superatmospheric pressure (about 1 or 2 atmospheres) and vigorous agitation.

After prolonged usage the fluosulfonic loses its activity to some extent. The partially spent catalyst may be removed from the reaction zone and subjected to any suitable regeneration or reactivation treatment.

I have found that when alkylating phenol with an olefin any amount of fluosulfonic acid from 0.1% to 100% based on the phenol will give a substantial yield of the alkylated phenol, but for practical operation and economical reasons it is preferred to use from 2% to 50% catalyst, which will give yields of substituted phenol from 70% to 90%.

The yield of substituted phenol is dependent on several factors, the molar ratio of the reactants (phenol and olefin), the temperature, pressure, time of contact with the catalyst, and catalyst concentration. By suitably adjusting the above variables mono, di and tri-substituted phenols can be readily prepared by this process.

It is desirable for the optimum results to use 1.0 to 1.1 moles of olefins to 1 mole of phenol, at either atmospheric or superatmospheric pressures. Superatmospheric pressure brings the reactants and catalyst in more intimate contact, thus increasing the speed of reaction and yields of substituted phenol.

The temperature at which the mono alkylation of the phenol is run determines the position at which alkylation takes place on the phenol nucleus. I have found that temperatures around 25° C. are optimum for producing high yields of para alkylated phenols. Para substitution decreases and ortho substitution increases when the temperature approaches or exceeds 50° C.

As to temperature ranges, the practical upper limit at atmospheric pressure is preferably below 100° C. and ordinarily about 90° C. because that is the temperature at which fluosulfonic acid begins to dissociate. With superatmospheric pressure higher temperatures can be used.

The practical lower temperature limit is controlled by the solubility characteristics of phenol and alkylated phenols in various inert solvents at low temperatures and the freezing point of fluosulfonic acid, which is −87° C. However, as the reaction proceeds efficiently at atmospheric or at slightly superatmospheric pressures and at usual atmospheric temperature ranges from −18° C. to +40° C., mechanically produced temperatures and pressures greater than several atmospheric pressures would be uneconomical, although within the scope of the invention.

Numerous types of inert organic solvents may be used in accordance with the present process, those preferred being aromatic hydrocarbons such as benzene, toluene, xylene, etc.; aliphatic solvents such as petroleum ether, gasoline, V. M. P., naphtha, normal hexane, heptane, octane, etc.; saturated cyclic compounds such as cyclohexane, methyl cyclohexane, etc., and hydrogenated naphtha. Chlorinated solvents may be used, such as carbon tetrachloride, ethylene dichloride and trichloride, dichlorobutane and chlorobenzene. The solubility of the phenol and para substituted phenols in the above listed solvents varies and therefore the concentration of the phenols in solvent ranges from about 10% to 80%. The practical concentration is from about 20% to 50% but the invention is not limited to this range.

The invention will be more readily understood by reference to the following examples, in which are set forth by way of illustration specific embodiments of the inventive thought, but it will be understood that the invention is not limited to the details of said specific examples:

Example 1

One hundred eighty-eight grams of phenol was added to 400 grams of benzene in a reaction vessel equipped with a sparge below the surface of the phenol benzene solution, agitator, condenser, etc. The solution was then cooled to 25° C. To the phenol benzene solution 26.2 grams of fluosulfonic acid was added, which caused a slight rise in temperature. The mixture was then cooled to 20° C. by means of a water bath. 132 grams of isobutylene was then passed in below the surface of the agitated solution through the sparge at such a rate that temperature was maintained around 25° C. When all of the isobutylene had been added (four hours) agitation was continued for several hours. When agitation was stopped 2 layers formed: the upper layer (approximately 98%) was clear colorless liquid, the lower layer (approximately 2%) was orange color, characteristic of a phenol complex with fluosulfonic acid. The upper layer was then removed, washed free of acid, then solution was dried and distilled to recover the benzene and unreacted phenol. The following are the fractions and percentages of the products obtained from the distillation:

10.0% phenol
2.5% o-tert butyl phenol
84.0% p-tert butyl phenol
1.5% residue (poly isobutylene and high molecular weight phenols)

Example 2

To 188 grams of phenol 400 grams of benzene was added in a suitable reaction vessel. The phenol benzene solution was cooled to 25° C. at which time 35 grams of fluosulfonic acid was added. One hundred twenty-eight grams of isobutylene was then slowly added through a sparge below the surface of the benzene phenol fluosulfonic acid solution during cooling and agitation. The temperature was maintained around 25° C. during the isobutylene addition. The isobutylene was all added in 1 hour, 20 minutes. Agitation was continued for 30 minutes longer, then stopped. The reactant solution was poured in water 30 minutes after the last addition of isobutylene. The solution was washed free of acid and then dried and distilled in the conventional manner to recover the benzene and alkylated phenols.

The following are the fractions and percentages of products recovered:

9.4% phenol
13.15% o-tert butyl phenol
74.0% para-tert butyl phenol
3.45% residue (poly isobutylene and high molecular weight phenols)

I claim:

1. A process for preparing para tertiary butyl phenol which comprises reacting substantially equimolecular quantities of isobutylene and phenol in liquid phase at a pressure of at least equal to substantially atmospheric and at a temperature below about 50° C. in the presence of an inert organic solvent and of a catalyst comprising essentially fluosulfonic acid.

2. A process for preparing para tertiary butyl phenol which comprises reacting isobutylene and phenol in benzene solution at a pressure of at least equal to substantially atmospheric and at a temperature below about 50° C. in the presence of a catalyst comprising essentially fluosulfonic acid.

3. A process for preparing para tertiary butyl phenol which comprises reacting isobutylene and phenol in substantially equimolecular quantities in liquid phase at a pressure of substantially atmospheric and at a temperature below about 50° C. in the presence of an inert organic solvent and of a catalyst comprising essentially fluosulfonic acid.

4. A process for preparing para tertiary butyl phenol which comprises reacting isobutylene and phenol in benzene solution at a pressure of substantially atmospheric and at a temperature below about 50° C. in the presence of a catalyst comprising essentially fluosulfonic acid.

5. The process of preparing para tertiary butyl phenol which comprises reacting substantially equimolecular quantities of isobutylene and phenol dissolved in an aromatic hydrocarbon solvent at substantially normal pressure and temperature for a period of several hours with continued agitation in the presence of a catalyst comprising essentially fluosulfonic acid, discontinuing the agitation and allowing the mass to settle into two layers and drawing off the upper layer containing principally para tertiary butyl phenol.

6. The process of preparing para tertiary butyl phenol which comprises reacting substantially equimolecular quantities of isobutylene and phenol dissolved in an aromatic hydrocarbon solvent at substantially normal pressure and temperature for a period of several hours with continued agitation in the presence of a catalyst comprising essentially fluosulfonic acid, discontinuing the agitation and allowing the mass to settle into two layers, drawing off the upper layer containing principally para tertiary butyl phenol, and recovering and re-using the catalyst from the lower layer.

7. The process of preparing paratertiary butyl phenol which comprises reacting substantially equimolecular quantities of isobutylene and phenol dissolved in an organic solvent at substantially normal pressure and temperature for a period of several hours with continued agitation in the presence of a catalyst comprising essentially fluosulfonic acid, discontinuing the agitation and allowing the mass to settle into two layers and drawing off the upper layer containing principally paratertiary butyl phenol.

8. The process of preparing paratertiary butyl phenol which comprises reacting substantially equimolecular quantities of isobutylene and phenol dissolved in an organic solvent at substantially normal pressure and temperature for a period of several hours with continued agitation in the presence of a catalyst comprising essentially fluosulfonic acid, discontinuing the agitation and allowing the mass to settle into two layers, drawing off the upper layer containing principally paratertiary butyl phenol, and recovering and re-using the catalyst from the lower layer.

CLINTON A. BRAIDWOOD.

REFERENCES CITED

The following references are of record in the file of this patent:

UNITED STATES PATENTS

| Number | Name | Date |
| --- | --- | --- |
| 2,008,017 | Hester | July 16, 1935 |
| 2,051,473 | Evans et al. | Aug. 18, 1936 |
| 2,259,723 | Ballard et al. | Oct. 21, 1941 |
| 2,287,949 | Smith et al. | June 30, 1942 |
| 2,349,211 | Tulleners | May 16, 1944 |